June 2, 1970   MASAHIKO INOUE   3,514,816
PUSHBUTTON SEPARABLE FASTENER
Filed March 25, 1969   3 Sheets-Sheet 1

Masahiko Inoue
INVENTOR

BY George B. Oujevolk
ATTORNEY

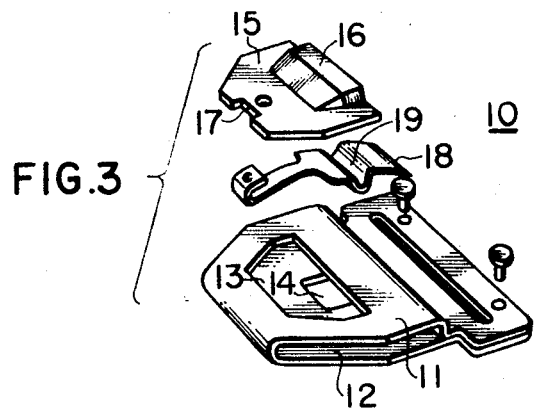
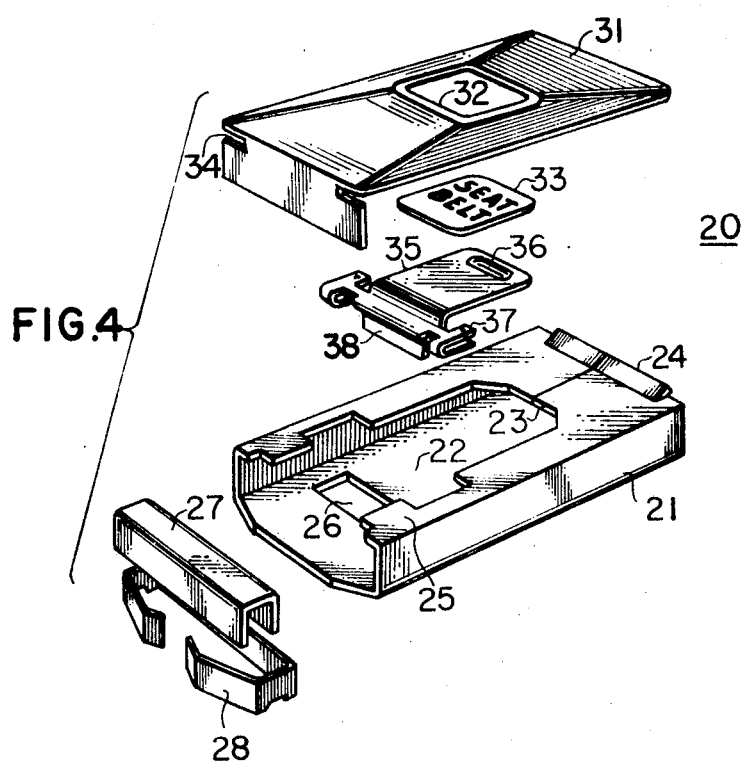

Masahiko Inoue
INVENTOR

BY

ATTORNEY

United States Patent Office
3,514,816
Patented June 2, 1970

3,514,816
PUSHBUTTON SEPARABLE FASTENER
Masahiko Inoue, Toyota-shi, Japan, assignor to Toyota Jidosha Kogyo Kabushiki Kaisha, Toyota-shi, Japan, a corporation of Japan
Filed Mar. 25, 1969, Ser. No. 810,235
Claims priority, application Japan, May 13, 1968, 43/31,662
Int. Cl. A44b 11/26
U.S. Cl. 24—77                                5 Claims

ABSTRACT OF THE DISCLOSURE

A pushbutton buckle device for an automobile safety belt wherein a latch enters a buckle. The buckle has a case defining an enclosure with an open front end and upper and lower openings. Within the case is a case plate spring secured to the case at one end and having a projection which is directed downward. The case is covered by a cover with an opening at the place corresponding to the mounting position of the case plate spring. The latch has an inserting member with upper and lower parallel plates and top and bottom openings in said plates. The parallel plates define a latch space within which is a hook piece. The hook piece has an engaging projection on the upper side thereof which projects outside the latch space from the top opening and passes through the upper opening of the case to be engaged therein. To bias the hook piece there is a support plate spring arranged on the lower side of the hook piece in the latch space secured to the hook piece at one end and partially projecting to the outside from the bottom opening.

BACKGROUND OF THE INVENTION

The present invention relates to a buckle device of an automobile safety belt used to fasten an occupant of a car seat to the seat or vehicle body so that the occupant is protected against forward throwing at the time of a head-on collision between cars or a sudden stop of the car. More particularly, the present invention relates to a buckle device which is unlocked by the operation of pushbutton.

The buckle devices of safety belts of the prior art use a lever unlocking system of buckle device besides a pushbutton system buckle device. However, since the inertia at the time of a collision, acts in the structurally unlocking direction of the lever or hook, the buckle device of the prior art tends to become unlocked unintentionally, and, in an emergency, a reliable locking cannot be expected. As compared with such a prior art device, the pushbutton system buckle device to which the present invention is directed does not cause unlocking of the engaged portion due to the inertia at the time of collision, but on the contrary is so constructed so as to further enhance the engagement.

SUMMARY OF THE INVENTION

Thus, the object of the present invention, with regard to such a pushbutton system buckle device is to provide a buckle device which comprises as small a number of parts as possible and in which movable portions do not use any particular support parts and are supported without rattling and the device does not cause unpleasant contact sounds at the same time of use.

Accordingly, this invention is an improvement in a pushbutton buckle device for an automobile safety belt wherein a latch enters a buckle. The buckle has a case defining an enclosure with an open front end and upper and lower openings. Within the case is a case plate spring secured to the case at one end and having a projection which is directed downward. The case is covered by a cover with an opening at the place corresponding to the mounting position of the case plate spring. The latch has an inserting member with upper and lower parallel plates and top and bottom openings in said plates. The parallel plates define a latch space within which is a hook piece. The hook piece has an engaging projection on the upper side the roof which projects outside the latch space from the top opening and passes through the upper opening of the case to be engaged thereon. To bias the hook piece there is a support plate spring arranged on the lower side of the hook piece in the latch space secured to the hook piece at one end and partially projecting to the outside from the bottom opening.

In the present invention, the support means of movable portions are effected by spring means instead of a pivot and therefore special working is not required and no rattling occurs. And the present invention has a construction such that the projection of the hook piece acts in the direction of being further and further pushed into the opening for the engagement with the case by inertia at the time of collision, or shortstop and thus safety is secured by the buckle device of the safety belt.

The invention as well as other objects and advantages thereof will be apparent from the following detailed description when taken in connection with the accompanying drawings in which:

BRIEF DESCRIPTION OF THE DRAWINGS

FIG. 3 is an exploded view of the latch member disassembled;
FIG. 4 is an exploded view of the buckle body disassembled.

DETAILED EXPLANATION OF INVENTION

Figure 1:
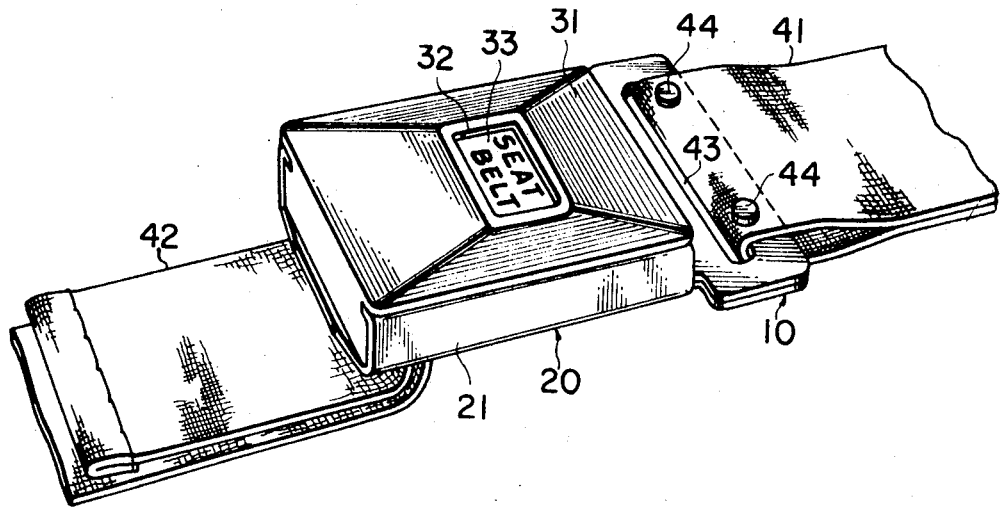
FIG. 1 is a perspective view of a buckle device according to the present invention.

The present invention will be explained in detail with reference to the drawing. As shown in a perspective view of FIG. 1, a buckle device of the present invention comprises a latch member 10 and a buckle body 20. The latch member 10 is provided with a slit 43 to which one end 41 of the safety belt is connected and is secured by calking pins 44, etc. The buckle device 20 comprises a case 21, a cover 31 and parts received therein, the other end 42 of the safety belt is half wound on a mounting rod received in this case cover as will be stated later and is connected so that the length of the belt may be freely adjusted. 32 indicates an opening for the operation of pushing which is bored nearly in the middle of the cover 31, 33 indicates a pushbutton or a style plate.

Figure 2:
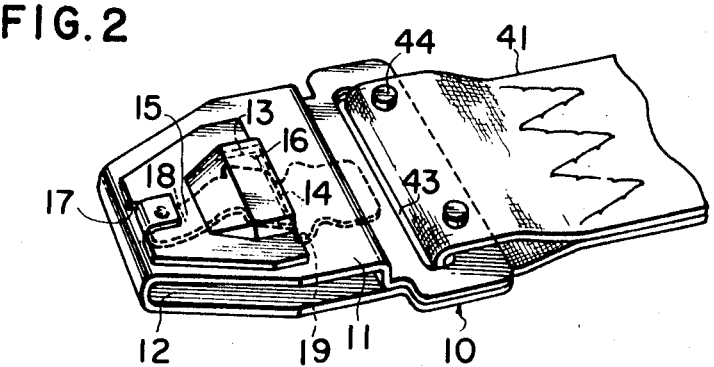
FIG. 2 is a perspective view of a latch member.

The latch member 10 comprises an inserting member 11, a hook piece 15 and a support plate spring 18 as shown in FIGS. 2 and 3. The inserting member 11 is formed by punching nearly symmetrically a sheet of metal plate and by bending it in overlapping. By this construction a space 12 is formed between overlapping parallel metal plates, and the hook piece 15 and the support plate spring 18 are arranged in this space 12. Openings 13, 14 are bored simultaneously when punching was made previously. An engaging projection 16 is formed by press at one end of the hook piece 15 and a notch 17 is provided at the other end. One end of the plate spring 18 is secured to this notch 17 by press or spot welding and a bending portion 19 is provided in the middle of the plate spring 18 as shown in the drawing. The hook piece 15 and the plate spring 18 connected to each other are inserted from the side of said inserting member 11 so that the projection 16 of the hook piece 15 may be fitted in the opening 13 and the bending portion 19 of the plate spring 18 is fitted in the opening 14. The other end of the plate spring 18 is secured by press between the metal plates of the inserting member 11. After that, one end 41 of the safety belt is turned up through the slit 43 and a secure connection is attained by the calking pin 44.

Forming parts of the buckle body are shown in FIG. 4 and an opening 22 having an engaging face 23 is formed in the case 21. 24 indicates an opening for the inserting member provided on the surface in the longitudinal direction, 25 a mounting seat of a plate spring 35 for unlocking, 26 an opening for guiding the safety belt. The plate spring 35 has a projection 36 formed by press and projected downward at its extreme end and has a U-shaped mounting leg 37 on both sides of the other end. The mounting seat 25 of the case 21 is inserted in this leg 37 and secured by press or spot welding. 38 indicates a stopper formed by bending it downward, 33 a pushbutton or a style plate formed by casting resin, etc. and this plate is secured to the plate spring 35 for unlocking by a binding agent.

31 indicates a cover and has an opening 32 at the position corresponding to the pushbutton 33. 34 indicates a socket portion in which the corresponding projection of the case 21 is fitted and which enables a simple mounting and disassembling of the cover. Further, 27 indicates a mounting rod having U-shaped section and one end of the safety belt is half wound on this rod and pulled out from the opening 26 as explained in FIG. 1. And since the length of this mounting rod 27 is longer than that of the opening 26, even if a tensile force acts on the safety belt, the mounting rod 27 is never released from the case 21. The opposed leg parts of a C-shaped spring 28 is arranged in a U-shaped groove of the mounting rod 27 and a straight connecting part comes in contact with the stopper 38 of the plate spring 35 for unlocking and therefore the mounting rod 27 is always deflected in the left direction of the drawing. Thereby, holding of the mounting rod 27 without rattling in the case 21 is performed.

Figure 5:
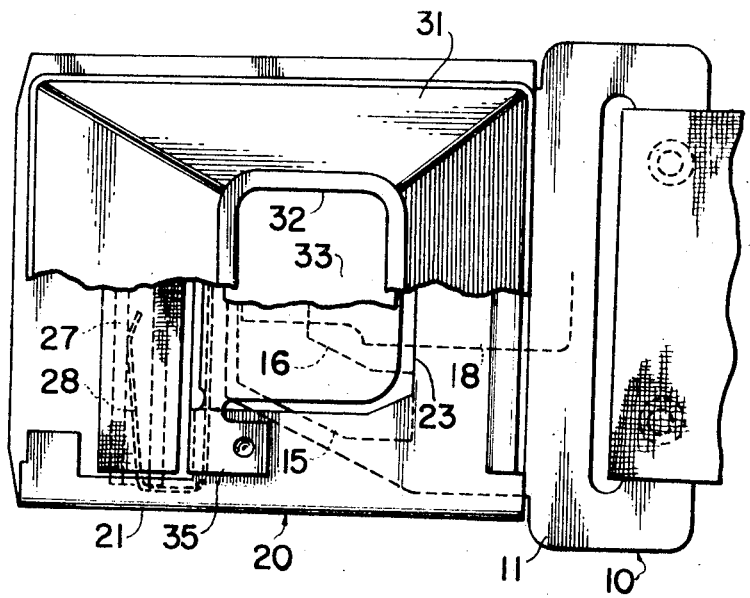
FIG. 5 is a plan view of the device of FIG. 1 showing also a half section in the state that the latch member is inserted in the buckle body; and,
FIG. 6 is a longitudinal sectional view of FIG. 5.
Figure 6:
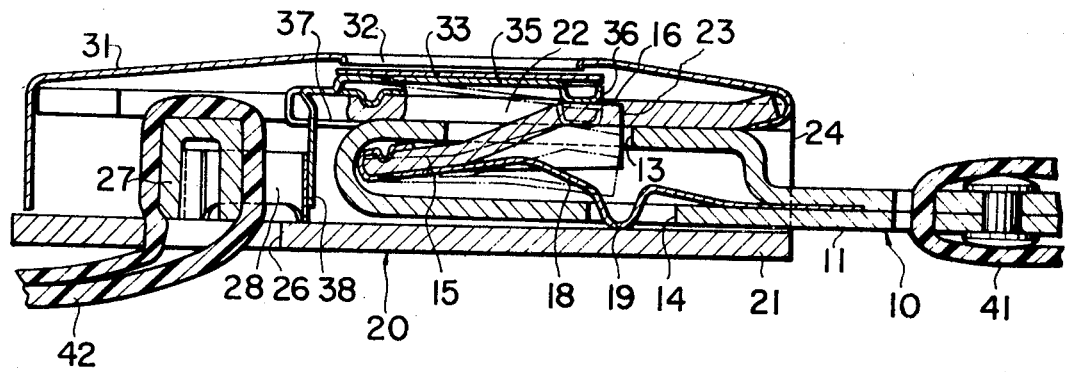

In FIGS. 5 and 6, the mounting position of said each forming parts is shown and at the same time the action of the buckle device of the present invention is explained. When the latch member 10 is inserted in the buckle body 20 from the opening 24, the engaging projection 16 of the hook piece 15 which is deflected upward by the support plate spring 18 is fitted in the engaging opening 22 formed on the upper face of the case 21 and the end face of the engaging projection 16 and the engaging face 23 of the opening 22 come to the state of being axially butted on each other. And the inserting member 11 is formed by overlapping it in almost the same thickness as the space between the upper and lower walls of the case 21 and moreover the bending portion 19 of the plate spring 18 is projected to the lower face from the opening 14 and deflects upward the whole of the inserting member 11 and is in contact with the upper wall of the case 21 and holds it and therefore rattling in this portion does not occur.

The projection 36 at the extreme end of the plate spring 35 for unlocking and which is mounted on the upper wall of case 21 is in contact with the upper face of the projection 16 of the hook piece 15 and on the upper face of this plate spring 35, there is held the style plate 33. This style plate 33 faces the opening 32 of the cover 31.

One end 42 of the safety belt is half wound on the mounting rod 27 and the opposed legs of the spring 28 is in contact with the left inner wall of the mounting rod 27 and the connecting portion is in contact with the stopper 38 integral with the spring 35 for unlocking. Consequently, the mounting rod 27 is deflected in the left direction.

The hook piece 15 is turned downward by pushing the style plate 33 as shown by dotted line and the engaging projection 16 is disengaged from the engaging face 23 of the case 21. When the latch member 10 is pulled when the projection is in this state, the latch member 10 is released from the buckle body 20.

In the present invention, plate springs 18, 35, 28 are effectively used for the mounting and holding of the parts without rattling taking place and at the same time a buckle device with small number of forming parts is provided.

It is to be observed therefore that the present invention provides for an improvement in a pushbutton buckle device of a safety belt for fastening the vehicle occupant to the seat or car body wherein to one end of a safety belt, there is connected a latch 10 with an inserting member 11 having a hook piece 15 biased by a support plate spring 18, said inserting member 11 being inserted into a buckle connected to the other end of a safety belt, the buckle having a case 20, a case plate spring 35 for unlocking, and a cover 31.

The improvement comprises the following concept:

(1) The case is a sheet of metal defining a substantially narrow box-like enclosure, with top and bottom elongated walls and an open front end 24 for receiving the inserting member 11. There is an upper opening 22 and a lower opening 26 in these top and bottom walls. The upper opening has an engaging inner face 23 towards the front open end 24.

(2) The case plate spring 35 has an outer end with a projection 36 directed downward, and an inner end 37 secured to said case.

(3) The cover 31 has an opening 32 at the place corresponding to the mounting position of the case plate spring 35.

(4) The inserting member 11 is a sheet of metal defining upper and lower parallel overlapping plates with a latch space 12 therebetween having a top opening 13 and a bottom opening 14 provided in said upper and lower plates respectively.

(5) Hook piece 15 is a flat tongue-shaped plate with upper and lower sides, disposed in latch space 12. The hook piece 15 has an engaging projection 16 on the upper side thereof which projects outside the latch space 12 from the top opening 13 and passes through the upper opening 22 of the case, engaging the engaging inner face 23.

(6) The support plate spring 18 is arranged on the lower side of the hook piece 15 in the latch space 12. This support plate spring 18 has a bent portion, one end of the support plate spring 18 is secured to one end 17 of the hook piece 15 while the bent portion projects to the outside from said bottom opening 14.

I claim:

1. In a pushbutton buckle device of a safety belt for fastening the vehicle occupant to the seat or car body wherein to one end of a safety belt, there is connected a latch (10) with an inserting member (11) having a hook piece (15) in said inserting member which is biased by a support plate spring (18), said inserting member (11) being inserted into a buckle connected to the other end of a safety belt, said buckle having a case (21), a case plate spring (35) for unlocking, and a cover (31), the improvement therein wherein:

(a) said case is a sheet of metal defining a substantially narrow box-like enclosure, with top and bottom elongated walls and an open front end (24) for receiving said inserting member (11);

(b) an upper opening (22) and a lower opening (26) in said top and bottom walls, said upper opening having an engaging inner face (23) towards the front open end (24);

(c) said case plate spring (35) having an outer end with a projection (36) directed downward, and an inner end (37) secured to said case;

(d) said cover (31) having an opening (32) at the place corresponding to the mounting position of the case plate spring (35), said cover closing said case;

(e) said inserting member (11) being a sheet of metal defining upper and lower parallel overlapping plates with a latch space (12) therebetween having a top opening (13) and a bottom opening (14) provided in said upper and lower plates respectively;

(f) said hook piece (15) being a flat tongue-shaped plate with upper and lower sides, and disposed in said latch space (12), said hook piece (15) having an engaging projection (16) on the upper side thereof which projects outside said latch space (12) from the top opening (13) and passes through the upper opening (22) of said case, engaging said engaging inner face (23); and, (g) said support plate spring (18) being arranged on the lower side of the hook piece (15) in said latch space (12) said support plate spring (18) having a bent portion, one end of said support plate spring (18) being secured to one end (17) of said hook piece (15) with said bent portion projecting to the outside from said bottom opening (14).

2. A pushbutton buckle device for an automobile safety belt comprising in combination:

(a) a buckle case defining a substantially narrow box-like enclosure, with top and bottom elongated walls and an open front end (24) for receiving a latch inserting member (11);

(b) an upper opening (22) and a lower opening (26) in said top and bottom walls, said upper opening having an engaging inner face (23) towards the front open end (24);

(c) a case plate spring (35) having an outer end with a projection (36) directed downward, and an inner end (37) secured to said case;

(d) a case cover (31) having an opening (32) at the place corresponding to the mounting position of the case plate spring (35), said cover closing said case;

(e) a latch inserting member (11) having upper and lower parallel overlapping plates connected at one end thereof with a latch space (12) therebetween having a top opening (13) and a bottom opening (14) provided in said upper and lower plates respectively;

(f) a hook piece (15) including a flat tongue-shaped plate with upper and lower sides, and disposed in said latch space (12), said hook piece (15) having an engaging projection (16) on the upper side thereof which projects outside said latch space (12) from the top opening (13) and passes through the upper opening (22) of said case, engaging said engaging inner face (23); and, (g) a support plate spring (18) arranged on the lower side of said hook piece (15) in said latch space (12) said support plate spring (18) having a bent portion, one end of said support plate spring (18) being secured to one end (17) of said hook piece (15) with said bent portion projecting to the outside from said bottom opening (14).

3. A pushbutton buckle device for an automobile safety belt comprising in combination:

(a) a case defining an enclosure, with top and bottom walls and an open front end (24) for receiving said inserting member (11), said case having an upper opening (22) and a lower opening (26) in said top and bottom walls;

(b) a case plate spring (35) having an outer end with a projection (36) directed downward, and an inner end (37) secured to said case;

(c) said cover (31) having an opening (32) at the place corresponding to the mounting position of the case plate spring (35), said cover closing said case;

(d) an inserting member (11) having upper and lower parallel overlapping plates with a latch space (12) therebetween having a top opening (13) and a bottom opening (14) provided in said upper and lower plates respectively;

(e) a hook piece (15) including flat upper and lower sides, disposed in said latch space (12), said hook piece (15) having an engaging projection (16) on the upper side thereof which projects outside said latch space (12) from the top opening (13) and passes through the upper opening (22) of said case, to be engaged therein; and, (f) a support plate spring (18) arranged on the lower side of the hook piece (15) in said latch space (12) said support plate spring (18) being secured to one end (17) of said hook piece (15) and partially projecting to the outside from said bottom opening (14) to bias said hook piece engaging projection (16).

4. A device as claimed in claim 3 wherein said case plate spring (35) having a projection (36) at one end, has a U-shaped mounting leg (37) on both sides of the other end, and said case (21) includes a mounting seat (25) defined by the top wall thereof which penetrates and is connected to said mounting leg.

5. A device as claimed in claim 3 including a mounting rod (27) with a U-shaped cross section mounted in the end of said case opposite said open front end (24), a narrow opening (26) in said case bottom wall for passage of a belt half-wound on said mounting rod (27), said opening (26) being of shorter length than said mounting rod, spring means (28) in said mounting rod U-shaped section and a stopper (38) on said support plate spring (35) for contacting and deflecting said mounting rod (27).

References Cited
UNITED STATES PATENTS 1,121,770 12/1914 Smith.
2,855,028 10/1958 Matthews.

BERNARD A. GELAK, Primary Examiner

U.S. Cl. X.R.

24—196, 230